US011412400B2

(12) United States Patent
Ratasuk et al.

(10) Patent No.: US 11,412,400 B2
(45) Date of Patent: Aug. 9, 2022

(54) METHOD FOR POSITIONING REFERENCE DESIGN

(71) Applicant: Nokia Technologies Oy, Espoo (FI)

(72) Inventors: Rapeepat Ratasuk, Hoffman Estates, IL (US); Juha Karjalainen, Oulu (FI); Nitin Mangalvedhe, Hoffman Estates, IL (US); Jari Hulkkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/148,381

(22) Filed: Oct. 1, 2018

(65) Prior Publication Data

US 2020/0107209 A1    Apr. 2, 2020

(51) Int. Cl.
*H04W 24/10* (2009.01)
*H04L 5/00* (2006.01)
*H04L 41/0806* (2022.01)
*H04W 56/00* (2009.01)

(52) U.S. Cl.
CPC ........... *H04W 24/10* (2013.01); *H04L 5/0048* (2013.01); *H04L 41/0806* (2013.01); *H04W 56/001* (2013.01)

(58) Field of Classification Search
CPC combination set(s) only.
See application file for complete search history.

(56) References Cited

U.S. PATENT DOCUMENTS

| | | | | |
|---|---|---|---|---|
| 2015/0365790 A1* | 12/2015 | Edge | ..................... | H04W 64/00 455/404.2 |
| 2017/0134128 A1 | 5/2017 | Opshaug et al. | ................... | 5/48 |
| 2017/0238298 A1* | 8/2017 | Wang | .................. | H04W 72/005 455/452.1 |
| 2017/0339660 A1* | 11/2017 | Kazmi | ................. | H04B 17/309 |
| 2018/0092129 A1* | 3/2018 | Guo | .................... | H04W 56/0005 |
| 2018/0262313 A1* | 9/2018 | Nam | ..................... | H04L 5/0044 |
| 2018/0337757 A1* | 11/2018 | Noh | ....................... | H04L 5/0064 |
| 2019/0182007 A1* | 6/2019 | Liu | .......................... | H04L 5/003 |
| 2019/0215136 A1* | 7/2019 | Zhou | ..................... | H04B 17/24 |

(Continued)

FOREIGN PATENT DOCUMENTS

EP    3 264 838 A1    1/2018

OTHER PUBLICATIONS

Intel Corporation, Ericsson "New SID: Study on NR Positioning Support" 3GPP TSG RAN Meeting #80,p. RP-181399, La Jolla, USA, Jun. 11-14, 2018.

(Continued)

*Primary Examiner* — Omer S Mian
*Assistant Examiner* — Bao G Nguyen
(74) *Attorney, Agent, or Firm* — Joseph C. Drish; Harrington & Smith

(57) ABSTRACT

A method includes receiving, at a terminal device, from at least one network device, positioning assistance information based on a predetermined resource configuration framework for positioning reference signals in a beamforming operation. The method also includes receiving a request for at least one measurement from the at least one network device, and determining the at least one measurement based on the predetermined resource configuration framework. The method further includes reporting, in response to the request, the at least one measurement based on the predetermined resource configuration framework.

18 Claims, 6 Drawing Sheets

(56) References Cited

U.S. PATENT DOCUMENTS

2019/0369201 A1* 12/2019 Akkarakaran ........ G01S 1/0428
2020/0107209 A1* 4/2020 Ratasuk .............. H04W 56/001
2020/0107383 A1* 4/2020 Novlan ............... H04W 56/003

OTHER PUBLICATIONS

"Potential Techniques for NR Positioning", Samsung, 3GPP TSG RAN WG1 Meeting #94bis, R1-1810855, Oct. 2018, 6 pages.

* cited by examiner

600

610: UE 110 receives positioning assistance information based on a predetermined resource configuration framework for positioning reference signals in a beamforming operation

620: UE 110 receives a request for measurements from location server 405

630: UE 110 performs measurements on the different PRS blocks

640: UE 110 reports measurement information from each cell up to the location server 405

Fig. 6

METHOD FOR POSITIONING REFERENCE DESIGN

TECHNICAL FIELD

The teachings in accordance with the exemplary embodiments of this invention relate generally to Radio Standards including physical layer (PHY), Medium access control (MAC), Radio Link Control (RLC), Radio Resource Control (RRC), etc., and particularly, to positioning. More specifically, teachings in accordance with the exemplary embodiments relate to positioning reference design.

BACKGROUND

Radio systems are known to require positioning. NR positioning is a study item for Rel-16 (RP-181399) as positioning (for example, enhanced 911 (E911)) is a requirement for a stand-alone NR system. OTDOA (Observed Time Difference of Arrival) is a downlink positioning technique in LTE and a leading candidate for NR. The OTDOA is a network based multi-lateration positioning scheme in which a UE performs RSTD (Reference Signal Time Difference) measurements based on PRS (Positioning Reference Signal) by the UE from multiple gNBs. In LTE, PRS is cell-specific and used by all UEs in the cell. However, in NR, especially at higher frequencies, beam-based operation is used.

Certain abbreviations that may be found in the description and/or in the Figures are herewith defined as follows:
- AoA Angle of arrival
- CORESET Control Resource Set
- CSI-RS Channel state information reference signal
- DCI Downlink control information
- DL Down link
- DMRS Demodulation Reference Signal
- eNB enhanced Node-B
- gNB 5G Enhanced Node B (Base station)
- L3 Layer 3
- LTE long term evolution
- NB Narrowband
- NR New radio
- NZP Non-zero power
- OTDOA Observed Time Difference of Arrival
- PDCCH Physical downlink control channel
- PRACH Physical random access channel
- PRB Physical resource block
- PRS Positioning Reference Signal
- PUSCH Physical uplink shared channel
- QCL Quasi co-located
- RSTD Reference Signal Time Difference
- SSB Synchronization Signal Block
- SSBI Synchronization Signal Block Index
- SINR Signal to interference plus noise ratio
- TRP Transmit-Receive Point
- UE User Equipment
- TRP Transmit-Receive Point
- 3GPP 3rd generation project partner
- ZP Zero power

BRIEF SUMMARY

The following summary includes examples and is merely intended to be exemplary. The summary is not intended to limit the scope of the claims.

In accordance with one aspect, an example method comprises receiving, at a terminal device, from at least one network device, positioning assistance information based on a predetermined resource configuration framework for positioning reference signals in a beamforming operation, receiving a request for at least one measurement from the at least one network device, determining the at least one measurement based on the predetermined resource configuration framework, and reporting, in response to the request, the at least one measurement based on the predetermined resource configuration framework.

In accordance with one aspect, an example method comprises configuring, by higher layer signaling, at least one resource based on a predetermined resource configuration framework for positioning reference signals in a beamforming operation, providing, by at least one network device, positioning assistance information to the terminal device based on the predetermined resource configuration framework, requesting, at the at least one network device, at least one measurement from the terminal device, and receiving, in response to the request, at least one report from the terminal device, wherein the at least one report includes measurement information based on the predetermined resource configuration framework.

In accordance with another aspect, an example apparatus comprises means for receiving, at the apparatus, from at least one network device, positioning assistance information based on a predetermined resource configuration framework for positioning reference signals in a beamforming operation, means for receiving a request for at least one measurement from the at least one network device, means for determining the at least one measurement based on the predetermined resource configuration framework, and means for reporting, in response to the request, the at least one measurement based on the predetermined resource configuration framework.

In accordance with another aspect, an example apparatus comprises means for configuring, by higher layer signaling, at least one resource based on a predetermined resource configuration framework for positioning reference signals in a beamforming operation, means for providing positioning assistance information to the terminal device based on the predetermined resource configuration framework, means for requesting at least one measurement from the terminal device, and means for receiving, in response to the request, at least one report from the terminal device, wherein the at least one report includes measurement information based on the predetermined resource configuration framework.

In accordance with another aspect, an example apparatus comprises at least one processor; and at least one non-transitory memory including computer program code, the at least one memory and the computer program code may be configured to, with the at least one processor, cause the apparatus to: receive, at a terminal device, from at least one network device, positioning assistance information based on a predetermined resource configuration framework for positioning reference signals in a beamforming operation, receive a request for at least one measurement from the at least one network device, determine the at least one measurement based on the predetermined resource configuration framework, and report, in response to the request, the at least one measurement based on the predetermined resource configuration framework.

In accordance with another aspect, an example apparatus comprises a non-transitory program storage device readable by a machine, tangibly embodying a program of instructions executable by the machine for performing operations, the operations comprising: receiving, at a terminal device, from at least one network device, positioning assistance information based on a predetermined resource configuration framework for positioning reference signals in a beamforming operation, receiving a request for at least one measurement from the at least one network device, determining the at least one measurement based on the predetermined resource configuration framework, and reporting, in response to the request, the at least one measurement based on the predetermined resource configuration framework.

In accordance with another aspect, an example apparatus comprises a non-transitory program storage device readable by a machine, tangibly embodying a program of instructions executable by the machine for performing operations, the operations comprising: configuring, by higher layer signaling, at least one resource based on a predetermined resource configuration framework for positioning reference signals in a beamforming operation, providing, by at least one network device, positioning assistance information to the terminal device based on the predetermined resource configuration framework, requesting, at the at least one network device, at least one measurement from the terminal device, and receiving, in response to the request, at least one report from the terminal device, wherein the at least one report includes measurement information based on the predetermined resource configuration framework.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 6 shows another method in accordance with example embodiments which may be performed by an apparatus.

DETAILED DESCRIPTION

In the example embodiments as described herein a method and apparatus that provides multi-beam downlink channel control procedures.

Figure 1:
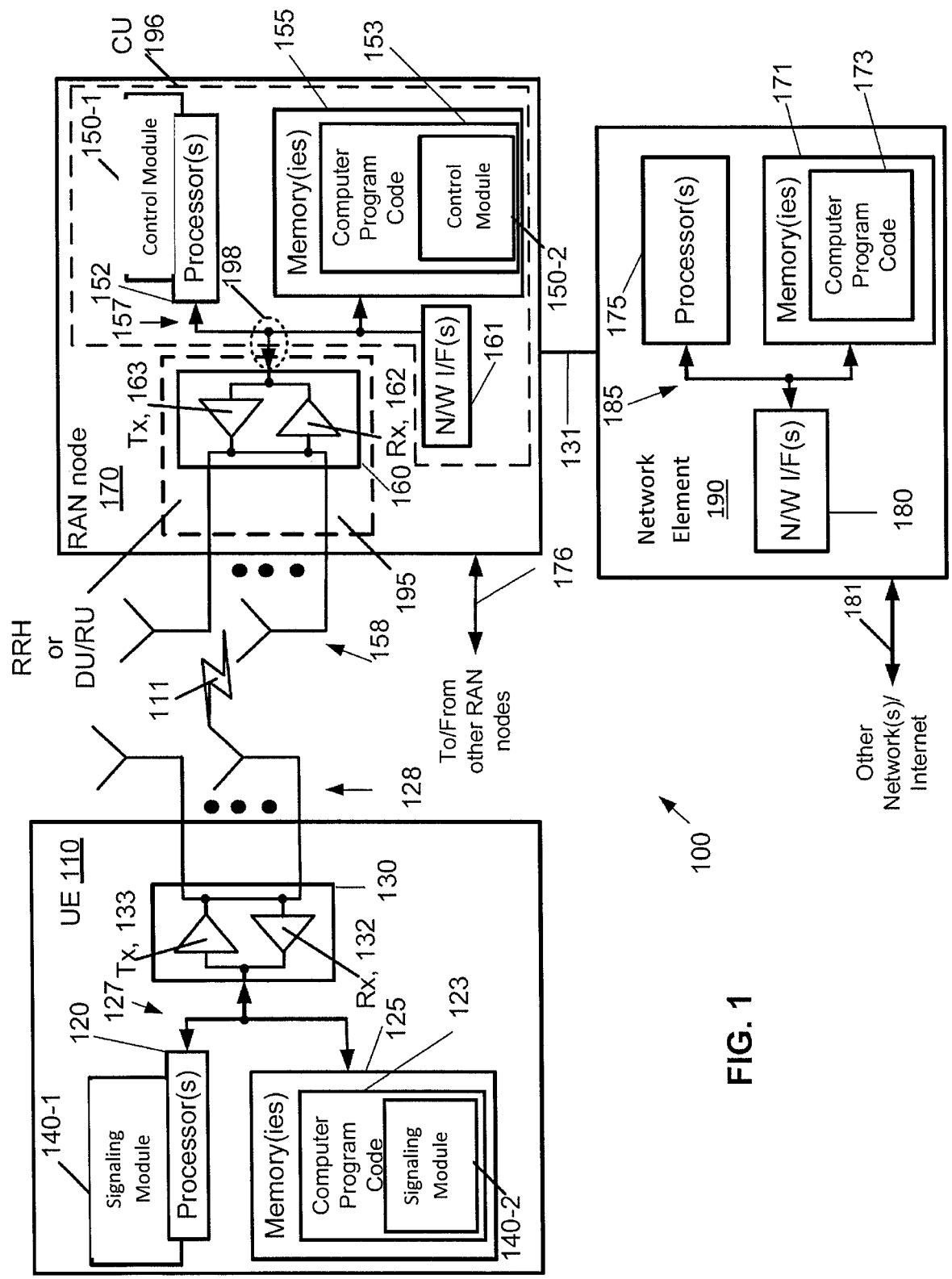
FIG. 1 is a block diagram of one possible and non-limiting example system in which the example embodiments may be practiced.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a signaling module 140, comprising one of or both parts 140-1 and/or 140-2, which may be implemented in a number of ways. The signaling module 140 may be implemented in hardware as signaling module 140-1, such as being implemented as part of the one or more processors 120. The signaling module 140-1 may be implemented also as an integrated circuit or through other hardware such as a programmable gate array. In another example, the signaling module 140 may be implemented as signaling module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

The wireless network 100 may include a network element (or elements) 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

Having thus introduced one suitable but non-limiting technical context for the practice of the exemplary embodiments of this invention, the exemplary embodiments will now be described with greater specificity.

FIGS. 2 (a) (LTE) and 2(b) (NR) shows an example illustration of comparison of LTE and NR operation 200.

Figure 2A:
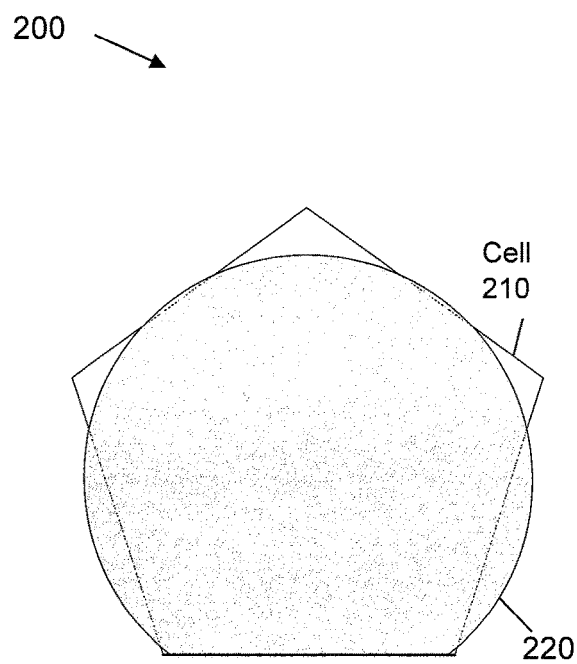
FIGS. 2(a) and 2(b) shows an example illustration of comparison of respectively LTE (FIG. 2(a)) and NR operation (FIG. 2(b))
Figure 2B:
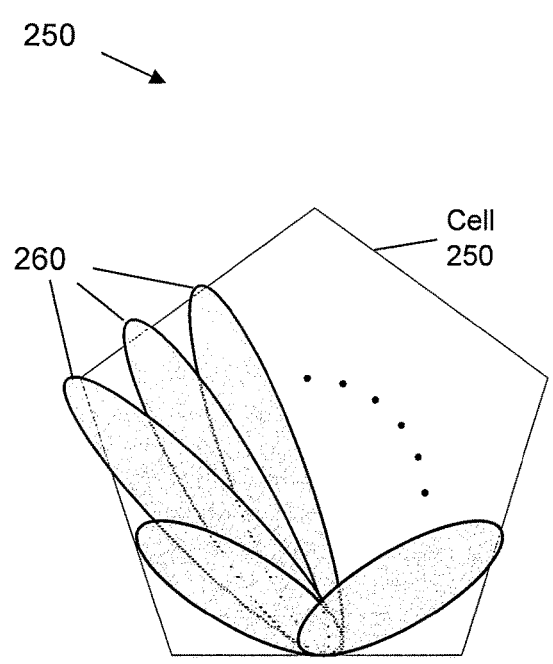

As shown in FIG. 2(a), in an LTE system, the cell 250 may include PRS that is cell-specific and used by all UEs 110 in the cell. In contrast, as shown in FIG. 2(b), in a beamforming based system, such as NR (shown in FIG. 2(a) by way of example), beam-based operation may be used. In the beam-based operation of FIG. 2(a), the cell 250 may include beams 260 that are transmitted (for example, propagated) in defined beams directed in particular directions.

The example embodiments provide a method (which may be implemented in instances such as FIG. 2(a)) for positioning reference signal design that can be based on beamforming operation.

OTDOA (Observed Time Difference of Arrival) is a downlink positioning technique in LTE. OTDOA relies on RSTD (Reference Signal Time Difference) measurements based on PRS (Positioning Reference Signal) by the UE 110. In LTE, PRS is cell-specific and used by all UEs in the cell. However, in Rel-15 NR, the separation of cell specific transmissions may be done either based on signals within synchronization signal block (SSB)s or CSI-RS design for L3-mobility. For SSB based cell-separation, both primary synchronization signal (PSS) as well secondary synchronization signals (SSS) are required to be detected to obtain Physical Cell ID information (PCI). Furthermore, at higher carrier frequencies, for example, above 6 GHz, beam-based operation is used adding a new dimension for positioning.

The example embodiments may enable different positioning service by providing schemes to support different positioning accuracy requirements. The example embodiments may enable NR positioning service support, and a reduction of implementation costs as well as provide an implementation solution in systems such as NR. The example embodiments may leverage (for example, currently existing) NR reference signals for positioning. The example embodiments described herein address technical challenges for implementation of positioning service in a beam-based operation (for example, NR), such as what reference signal type, and how to utilize the reference signals efficiently and enable reliable measurements in different deployment scenarios with reduced reference signal overheads.

Figure 3:
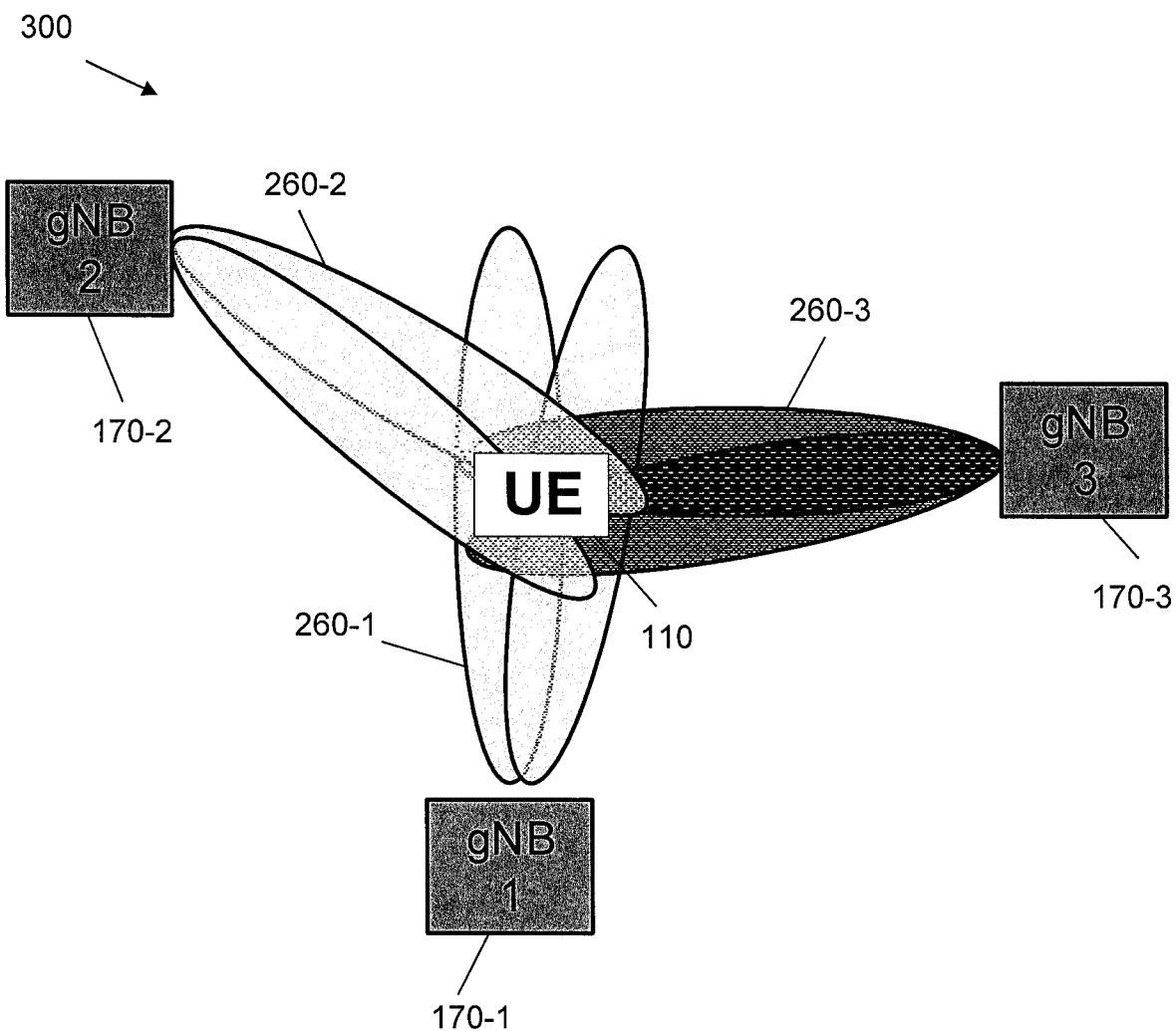
FIG. 3 shows an example illustration of PRS design with beamforming operation.

Referring to FIG. 3, there is shown an example illustration of PRS design with beamforming operation 300.

As shown in FIG. 3, a UE 110 may receive different (sets of) beams 260 (260-1, 260-2, and 260-3) from different gNBs 170 (shown respectively as 170-1, 170-2 and 170-3).

The example embodiments implement NR PRS based on SSB, NZP/ZP-CSI-RS and DMRS resource configuration framework.

The example embodiments may provide methods for positioning reference design based on frameworks such as a SSB framework, CSI-RS framework, a DMRS framework, or on a combination of SSB, NZP/ZP-CSI-RS and DMRS framework.

The example embodiments may provide a positioning reference design based on a SSB framework. In one example embodiment, a network configures by higher-layer signaling a set of SSB resources (for example, PSS, SSS, and DMRS of PBCH) associated with a reference cell or TRP and neighboring cells or TRPs within a same cell, as measurement resources for positioning.

In the example embodiment based on a SSB framework, resources may have same or different time periodicity as well as frequency allocation as SSB resources dedicated for initial access and/or beam management. Single antenna port DMRS resources associated with PBCH with configured SSBs may be used for RSTD measurements at UE-side.

To enable interference coordination for RSTD measurements across multiple cells, the network 100 may configure by higher layer signaling SSB resource muting patterns in time-domain for UE 110 that define RSTD measurements occasions. The pattern defines a set of SSB resources being simultaneously transmitted. The set may be based on physical cell ID: for example, at one time instant, a set of four different SSB resources having different physical cell IDs are available for RSTD measurements at the time (in this instance there will be no overlapping SSB resources in frequency). At a next time instant, another set of four different SSB resources having different physical cell IDs are available for measurements at the time. The set may be based on SSB resource indicators within a cell. For example, at one time instant, a set of SSB resources is available for measurements. The pattern may also define time-domain periodicity for a set of SSB resources being transmitted for RSTD measurements. Network may configure, by higher layers (for example, higher layer signaling), the pattern to be a cell specific or a TRP set specific.

UE 110 may perform RSTD measurement for all PRS blocks of the reference cell or select to do RSTD measurement(s) for a configured number of best PRS blocks(s) of the reference cell (for example, based on reported SSBI). UE 110 can perform RSTD measurements for the single best PRS block of the neighbor cell or on select to do RSTD measurement(s) for a configured number (for example, 2) of best PRS blocks of the reference cell. Multiple RSTD measurements from the same cell can be reported to the localization server (for example, best 1-4 reports). RSTD reports may be configured to contain the PRS index in the reference cell (which, for example, can be tied to SSBI), PRS index in the neighbor cell, and RSTD.

Measurements from different beams of the reference cell and neighbor cell can be used for localization. In some instances, the UE 110 may perform localization using reports from only 1 neighbor cell (for example, if measurements can be extended to cover Angle of Arrival from the reference cell and neighbor cell). PRS configuration may be performed in the following manner. PRS block/port information for each cell may be provided to UE 110 via location server (part of OTDOA assistance information). Neighbor cell(s) for RSTD measurement can be selected based on previous reports on best beams. The number of cells for reporting RSTD measurements can be transparent to the UE 110, for example, the UE 110 can be configured to report RSTD measurements for two beams from a single neighbor cell. In some instance, measurement report may also include information about the PRS block/port. Location server/manager (not shown in FIG. 3) can also provide PRS block/port information to other network entity to facilitate fast switch.

The example embodiments may provide a positioning reference design based on a CSI-RS framework. In one example embodiment based on a CSI-RS framework, a network may configure, by higher layer signaling, a set of periodic L3-mobility CSI-RS resources associated with a reference cell or TRP and neighboring cells or TRPs within same cell as measurement resources for positioning. In another example embodiment, a network configures by higher layer signaling a set of non-zero-power (NZP) CSI-RS resources for beam management associated with a reference cell or TRP and neighboring cells or TRPs within a same cell as measurement resources for positioning. In another example embodiment, a network configures by higher layer signaling a set of CSI-RS resources for time-frequency tracking associated with a reference cell or TRP and neighboring cells or TRSs within a same cell as measurement resources for positioning. In this embodiment, resources can be periodic or aperiodic.

In an example embodiment based on a CSI-RS framework, a network may configure, by higher layer signaling, a set of periodic L3-mobility CSI-RS resources associated with a reference cell or TRP and neighboring cells or TRPs within same cell as measurement resources for positioning. Resources can have same or different time periodicity as well as frequency allocation as for L3-mobility mobility measurements.

To enable interference coordination for RSTD measurements across multiple cells, the network may configure, by higher layer signaling, L3-mobility CSI-RS resource muting patterns in time-domain for UE 110 that define RSTD measurements occasions. The pattern defines a set of L3-mobility CSI-RS resources being simultaneously transmitted. The pattern may be based on physical cell ID: for example, at one time instant, a set of four different L3-mobility CSI-RS resources having different physical cell IDs are available for RSTD measurements at the time. At a next time instant, another set of four different L3-mobility CSI-RS resources having different physical cell IDs may be available for measurements at the time. Furthermore, the pattern may be based also on the beamforming pattern or beam ID. For example, different CSI-RS corresponding to different beams may be transmitted across multiple cells. The pattern may be based on SSB resource within a cell. For example, at one time instant, a set of SSB resources may be available for measurements. The pattern also defines time-domain periodicity for a set of L3-mobility CSI-RS resources being transmitted for RSTD measurements. Network may configure, by higher layers, the pattern to be a cell specific or a TRP set specific.

In another example embodiment, a network configures, by higher layer signaling, a set of non-zero-power (NZP) CSI-RS resources for beam management associated with a reference cell or TRP and neighboring cells or TRPs within a same cell as measurement resources for positioning. In this example embodiment, RSTD measurement resources can be configured to be periodic or semi-persistent or aperiodic via higher layer signaling. Circulation may be set to repeat, for example, circulation of (repetition ON). In this example embodiment, a muting pattern may also be defined for RSTD measurements by using NZP and ZP.

The example embodiments may provide a positioning reference design based on a DMRS framework. In one example embodiment, a network may configure, by higher layer signaling, DMRS resources of PDCCH associated with a reference cell CORESET and CORESET of neighboring cell or TRP within as measurement resources for positioning.

The example embodiments may provide a positioning reference design based on a combination of SSB, NZP/ZP-CSI-RS and DMRS framework. In one example embodiment, a network configures by a higher layer signaling a combination of SSB and/or CSI-RS L3-mobility and/or DMRS of PDCCH resources associated with reference cell and neighboring cells or TRPs within a same cell as measurement resources for positioning. When resources of CSI-RS for L3-mobility are associated with a defined SSB resource(s) and for higher carrier frequencies aforementioned resources are spatially quasi-collocated (QCL-ed): for example, UE 110 performs RSTD measurements from combined resources. RE density for L3-CSI-RS is required to be equal to 3 (for example, comb-4) as well as same numerology as SSB for enabling the use of joint measurement resources for RSTD measurements. As a result of this, wider bandwidth may be configured for RSTD measurements leading to higher positioning accuracy. When resources of SSB and DMRS for PDCCH are configured for positioning and at higher carrier frequencies resources are spatially QCL-ed: for example, UE 110 uses resource elements of both DMRS of PDCCH and DMRS of PBCH for RSTD measurements. Network can configure by higher layers UE 110 to use SSB resources for initial RSTD measurements when UE's 110 bandwidth part switch occurs to one where SSB resources do not exist.

In one example embodiment, a network configures a set of spatially SSB and CSI-RS resources associated with reference cell/TRP and different neighboring cell or TRPS within same cell as measurement resources for positioning.

In one example embodiment, a network configures a set of CSI-RS resources for time- and frequency tracking.

In one example embodiment, the time uncertainty compensation of RSTD measurements associated with multi-numerology SSB and/or CSI-RS and/or resources over configured reference cell and neighboring cells is defined at UE-side. When CSI-RS L3-mobility resources across different cells share same numerology, bias compensation for RSTD measurements may not be required at UE-side. When CSI-RS L3-mobility resources across different cells do not share same numerology, bias compensation may be performed at UE-side to enable comparable/reliable RSTD measurements.

Figure 4:
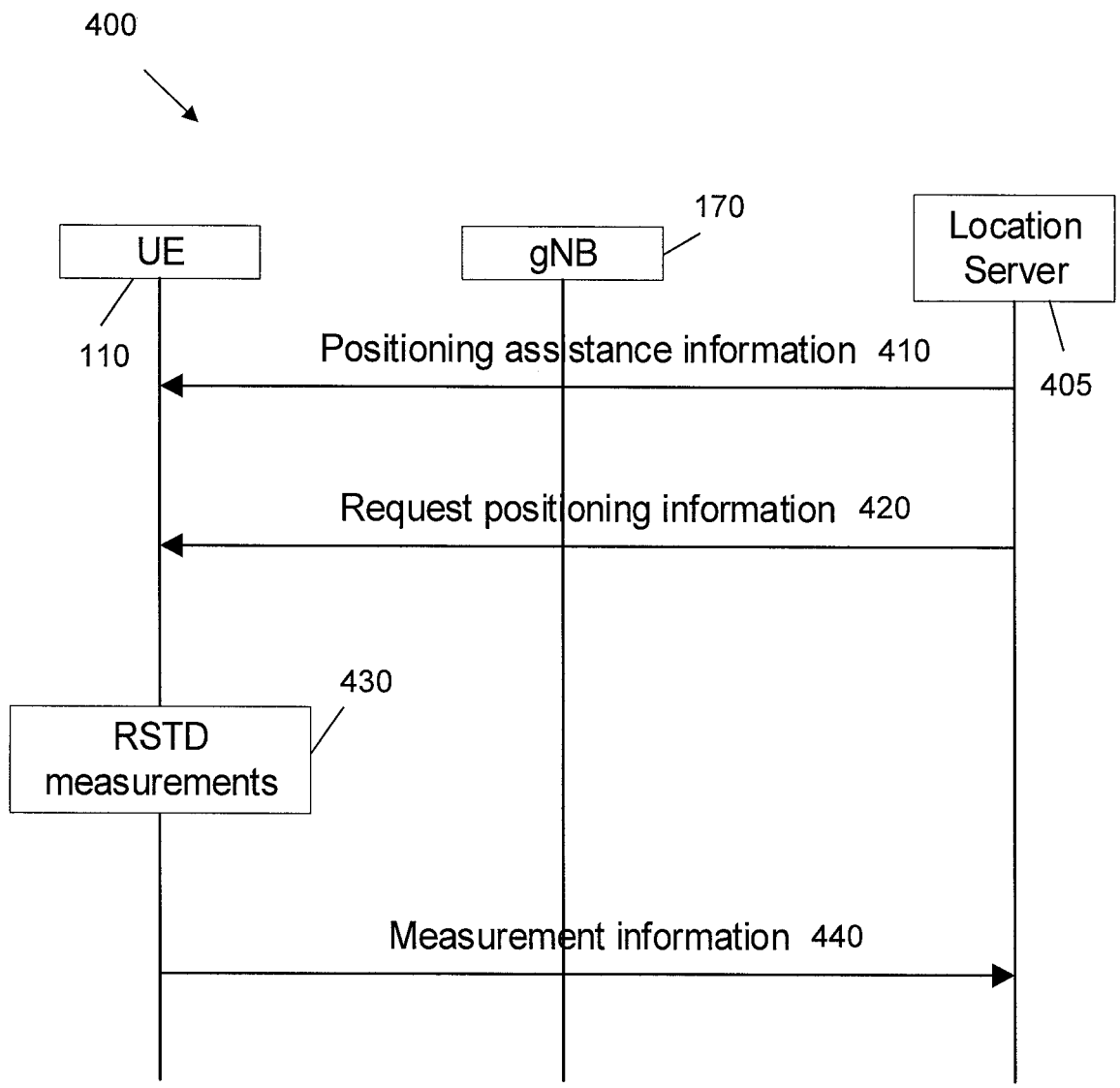
FIG. 4 shows an example illustration of Procedure for positioning.

FIG. 4 shows an example illustration of a procedure for positioning 400. As shown, procedure 400 may include a UE 110, gNB 170 and a location server 405.

Network may configure multiple PRS blocks based on SSB. Location server 405 provides this information (positioning assistance information 410) to the UE 110 for reference and other cells. When location server 405 requests measurements (request positioning information 420), UE 110 performs RSTD (and optically AoA) measurements (RTSD measurements 430) on the different PRS blocks. In another example embodiment, UE 110 performs measurements on the best K PRS blocks corresponding to the best K SSB indices (i.e. UE first determines the best K SSBs based on for example RSRP measurement then performs measurements on the PRS blocks associated with the best K SSBs). UE 110 reports best L measurements (e.g. based on RSRP or signal-to-noise ratio) from each cell up to the location server 405 where L is less than or equal to K.

Figure 5:
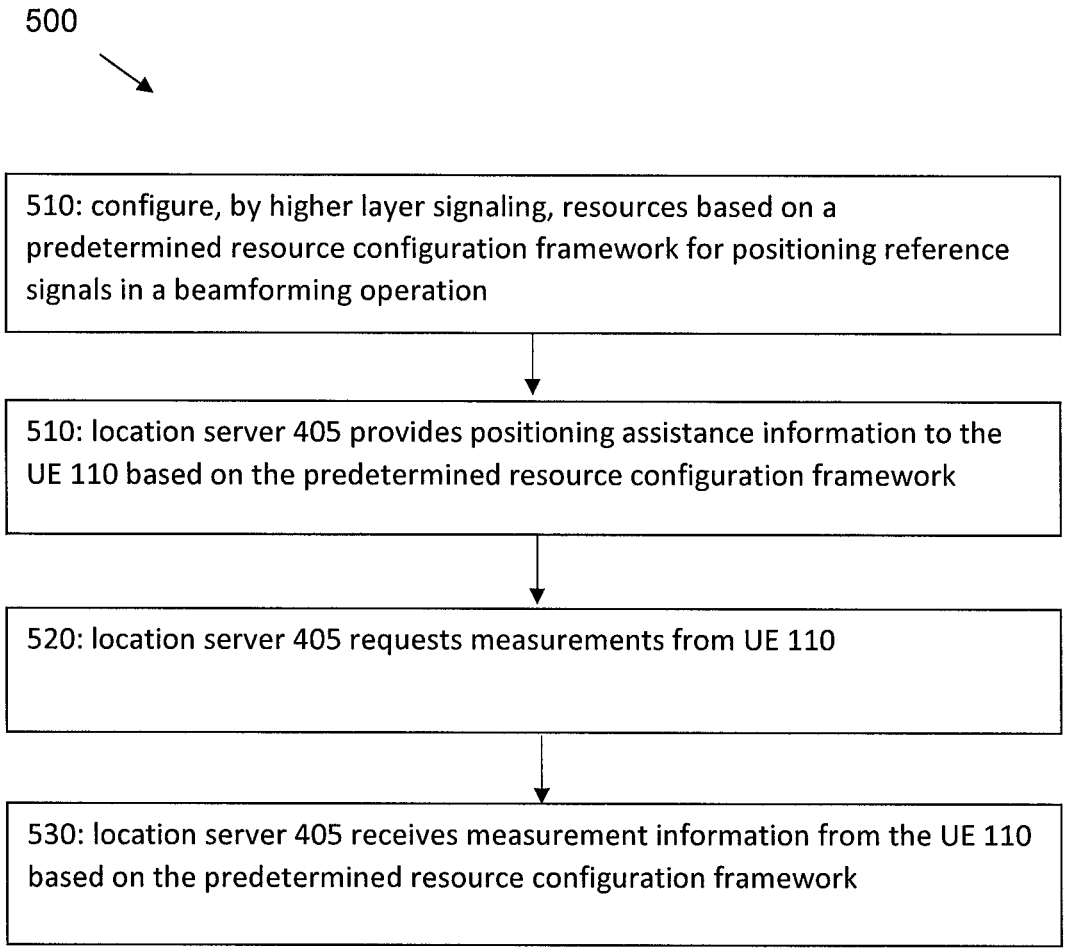
FIG. 5 shows a method in accordance with example embodiments which may be performed by an apparatus.

FIG. 5 is an example flow diagram 500 illustrating a method in accordance with example embodiments which may be performed by an apparatus.

At block 510, the network may configure, by higher layer signaling, resources based on a predetermined resource configuration framework for positioning reference signals in a beamforming operation.

At block 520, location server 405 may provide positioning assistance information to a UE 110 (for example, for reference) and may also provide this information to other cells. The positioning assistance information may have been determined based on the network configuring resources based on the resource configuration framework with a positioning reference signal design that is applicable to at least one beamforming operation. For example, in an SSB framework, the network may have configured multiple PRS blocks based on SSB.

At block 530, location server 405 may request measurements from UE 110. UE 110 may perform RSTD (and optically AoA) measurements on the different PRS blocks. In another embodiment, UE 110 performs measurements on the best K PRS blocks corresponding to the best K SSB indices.

At block 540, location server 405 may receive measurement information (for example, a report) from the UE 110 based on the predetermined resource configuration framework with a positioning reference signal design that is applicable to at least one beamforming operation. According to one example embodiment, the measurement information may include the best L measurements from each cell.

FIG. 6 is an example flow diagram 600 illustrating a method in accordance with example embodiments which may be performed by an apparatus At block 610, UE 110 may receive positioning assistance information (for example, from location server 405). The positioning assistance information may have been determined based on the network configuring resources based on a resource configuration framework with a positioning reference signal design that is applicable to at least one beamforming operation. For example, in an SSB framework, the network may have configured multiple PRS blocks based on SSB.

At block 620, UE 110 may receive a request for positioning information (for example, measurements) from location server 405.

At block 620, UE 110 may use this positioning assistance information for reference while taking measurements, such as reference signal time difference measurements. UE 110 may perform RSTD (and optically AoA) measurements on the different PRS blocks. In an alternative embodiment, UE 110 performs measurements on the best K PRS blocks corresponding to the best K SSB indices.

At block 650, UE 110 may report the measurements to the location server 405. For example, UE 110 may report the best L measurements from each cell up to the location server 405.

Without in any way limiting the scope, interpretation, or application of the claims appearing below, a technical effect of one or more of the example embodiments disclosed herein is significantly better RSTD measurements with beamforming due to better SINR and also built-in interference avoidance (for example, beams from cell 1 are not overlapping with beams from cell 2 in time). Another technical effect of the example embodiments is a capability to receive several unique measurements from the same cell. This reduces the number of required cells and improves performance. Another technical effect is that the processes may be adapted (or implemented) to support localization using only 1 cell (for example, combining of RSTD and AoA measurements from different beams).

An example embodiment may provide a method comprising receiving, at a terminal device, from at least one network device, positioning assistance information based on a predetermined resource configuration framework for positioning reference signals in a beamforming operation, receiving a request for at least one measurement from the at least one network device, determining the at least one measurement based on the predetermined resource configuration framework, and reporting, in response to the request, the at least one measurement based on the predetermined resource configuration framework.

In accordance with the example embodiments as described in the paragraphs above, wherein the predetermined resource configuration framework is a synchronization signal block framework, further comprising reporting a reference signal time difference report, wherein the reference signal time difference report includes a positioning reference signal index in at least one reference cell, a positioning reference signal index in at least one neighbor cell, and a reference signal time difference.

In accordance with the example embodiments as described in the paragraphs above, wherein the synchronization signal block framework further comprises a configuration of a set of synchronization signal block resources associated with at least one of a reference cell and a transmit-receive point.

In accordance with the example embodiments as described in the paragraphs above, wherein at least one resource configured based on the predetermined resource configuration framework includes at least one of a same time periodicity and a different time periodicity as synchronization signal block resources dedicated for at least one of initial access and beam management.

In accordance with the example embodiments as described in the paragraphs above, wherein at least one resource configured based on the predetermined resource configuration framework includes a synchronization signal block resource muting pattern in time-domain for the terminal device that defines reference signal time difference measurement occasions.

In accordance with the example embodiments as described in the paragraphs above, wherein the predetermined resource configuration framework is a channel state information reference signal framework.

In accordance with the example embodiments as described in the paragraphs above, wherein the channel state information reference signal framework further comprises a configuration of a set of periodic channel state information reference signal resources associated with at least one of a reference cell and a transmit-receive point.

In accordance with the example embodiments as described in the paragraphs above, wherein the channel state information reference signal framework further comprises a configuration of a set of non-zero-power channel state information reference signal resources for beam management associated with at least one of a reference cell and a transmit-receive point.

In accordance with the example embodiments as described in the paragraphs above, wherein the predetermined resource configuration framework is a demodulation reference signal framework.

In accordance with the example embodiments as described in the paragraphs above, wherein the predetermined resource configuration framework is a combination of a synchronization signal block, a channel state information reference signal, and a demodulation reference signal framework.

An example embodiment may provide a method comprising configuring, by higher layer signaling, at least one resource based on a predetermined resource configuration framework for positioning reference signals in a beamforming operation, providing, by at least one network device, positioning assistance information to the terminal device based on the predetermined resource configuration framework, requesting, at the at least one network device, at least one measurement from the terminal device, and receiving, in response to the request, at least one report from the terminal device, wherein the at least one report includes measurement information based on the predetermined resource configuration framework.

In accordance with the example embodiments as described in the paragraphs above, wherein the positioning reference signal design is a synchronization signal block framework.

In accordance with the example embodiments as described in the paragraphs above, receiving a reference signal time difference report, wherein the reference signal time difference report includes a positioning reference signal index in at least one reference cell, a positioning reference signal index in at least one neighbor cell, and a reference signal time difference.

In accordance with the example embodiments as described in the paragraphs above, wherein the synchronization signal block framework further comprises a configuration of a set of synchronization signal block resources associated with at least one of a reference cell and a transmit-receive point.

In accordance with the example embodiments as described in the paragraphs above, wherein at least one resource configured based on the predetermined resource configuration framework includes at least one of a same time periodicity and a different time periodicity as synchronization signal block resources dedicated for at least one of initial access and beam management.

In accordance with the example embodiments as described in the paragraphs above, wherein the predetermined resource configuration framework is a channel state information reference signal framework.

In accordance with the example embodiments as described in the paragraphs above, wherein the channel state information reference signal framework further comprises a configuration of a set of periodic mobility channel state information reference signal resources associated with at least one of a reference cell and a transmit-receive point.

In accordance with the example embodiments as described in the paragraphs above, wherein the predetermined resource configuration framework is a combination of a synchronization signal block, a channel state information reference signal, and a demodulation reference signal framework.

An example embodiment may be provided in an apparatus comprising at least one processor; and at least one non-transitory memory including computer program code, the at least one memory and the computer program code may be configured to, with the at least one processor, cause the apparatus to: receive, at a terminal device, from at least one network device, positioning assistance information based on a predetermined resource configuration framework for positioning reference signals in a beamforming operation, receive a request for at least one measurement from the at least one network device, determine the at least one measurement based on the predetermined resource configuration framework, and report, in response to the request, the at least one measurement based on the predetermined resource configuration framework.

In accordance with the example embodiments as described in the paragraphs above, wherein the predetermined resource configuration framework is a synchronization signal block framework, further comprising reporting a reference signal time difference report, wherein the reference signal time difference report includes a positioning reference signal index in at least one reference cell, a positioning reference signal index in at least one neighbor cell, and a reference signal time difference.

In accordance with the example embodiments as described in the paragraphs above, wherein the synchronization signal block framework further comprises a configuration of a set of synchronization signal block resources associated with at least one of a reference cell and a transmit-receive point.

In accordance with the example embodiments as described in the paragraphs above, wherein at least one resource configured based on the predetermined resource configuration framework includes at least one of a same time periodicity and a different time periodicity as synchronization signal block resources dedicated for at least one of initial access and beam management.

In accordance with the example embodiments as described in the paragraphs above, wherein at least one resource configured based on the predetermined resource configuration framework includes a synchronization signal block resource muting pattern in time-domain for the terminal device that defines reference signal time difference measurement occasions.

In accordance with the example embodiments as described in the paragraphs above, wherein the predetermined resource configuration framework is a channel state information reference signal framework.

In accordance with the example embodiments as described in the paragraphs above, wherein the channel state information reference signal framework further comprises a configuration of a set of periodic channel state information reference signal resources associated with at least one of a reference cell and a transmit-receive point.

In accordance with the example embodiments as described in the paragraphs above, wherein the channel state information reference signal framework further comprises a configuration of a set of non-zero-power channel state information reference signal resources for beam management associated with at least one of a reference cell and a transmit-receive point.

In accordance with the example embodiments as described in the paragraphs above, wherein the predetermined resource configuration framework is a demodulation reference signal framework.

In accordance with the example embodiments as described in the paragraphs above, wherein the predetermined resource configuration framework is a combination of a synchronization signal block, a channel state information reference signal, and a demodulation reference signal framework.

An example embodiment may be provided in an apparatus comprising means for receiving, at the apparatus, from at least one network device, positioning assistance information based on a predetermined resource configuration framework for positioning reference signals in a beamforming operation, means for receiving a request for at least one measurement from the at least one network device, means for determining the at least one measurement based on the predetermined resource configuration framework, and means for reporting, in response to the request, the at least one measurement based on the predetermined resource configuration framework.

An example embodiment may be provided in an apparatus comprising means for configuring, by higher layer signaling, at least one resource based on a predetermined resource configuration framework for positioning reference signals in a beamforming operation; means for providing positioning assistance information to the terminal device based on the predetermined resource configuration framework; means for requesting at least one measurement from the terminal device; and means for receiving, in response to the request, at least one report from the terminal device, wherein the at least one report includes measurement information based on the predetermined resource configuration framework.

In accordance with the example embodiments as described in the paragraphs above, wherein the positioning reference signal design is a synchronization signal block framework.

In accordance with the example embodiments as described in the paragraphs above, means for receiving a reference signal time difference report, wherein the reference signal time difference report includes a positioning reference signal index in at least one reference cell, a positioning reference signal index in at least one neighbor cell, and a reference signal time difference.

In accordance with the example embodiments as described in the paragraphs above, wherein the synchronization signal block framework further comprises a configuration of a set of synchronization signal block resources associated with at least one of a reference cell and a transmit-receive point.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
  receiving, at a terminal device, from at least one network device, positioning assistance information based on a predetermined resource configuration framework for positioning reference signals in a beamforming operation, wherein the predetermined resource configuration framework further comprises a configuration of a set of synchronization signal block resources associated with at least one of a reference cell or a transmit-receive point, and wherein at least one resource configured based on the predetermined resource configuration framework includes a synchronization signal block resource muting pattern in time-domain for the terminal device that defines reference signal time difference measurement occasions, and that defines a set of synchronization signal block resources to be transmitted simultaneously based on a physical cell identifier, or based on synchronization signal block resource indicators within a cell;

receiving a request for at least one measurement from the at least one network device;

determining the at least one measurement based on the predetermined resource configuration framework;

reporting, in response to the request, the at least one measurement based on the predetermined resource configuration framework;

determining a set comprising a number of synchronization signal block indices having a highest reference signal received power measurement relative to other synchronization signal block indices;

performing the at least one measurement on positioning reference signal blocks associated with the set comprising the number of synchronization signal block indices having the highest reference signal received power measurement relative to other synchronization signal block indices;

wherein the reporting comprises at least one report that includes a number of the at least one measurement having a highest reference signal receive power or signal-to-noise ratio relative to other positioning reference signal blocks within the set of synchronization signal block indices, where the number of the at least one measurement is less than or equal to the number of synchronization signal block indices;

receiving, at a first time instant, a first set of a plurality of synchronization signal block resources having different physical cell identifiers that are available for reference signal time difference measurements at the first time instant, wherein none of the synchronization signal block resources of the first set overlap in frequency; and receiving, at a second time instant, a second set of a plurality of synchronization signal block resources having different physical cell identifiers that are available for reference signal time difference measurements at the second time instant;

wherein the at least one measurement is reported based on the received first set of the plurality of synchronization signal block resources and the received second set of the plurality of synchronization signal block resources.

2. The method of claim 1, wherein the predetermined resource configuration framework is a synchronization signal block framework, further comprising:

reporting a reference signal time difference report, wherein the reference signal time difference report includes a positioning reference signal index in at least one reference cell, a positioning reference signal index in at least one neighbor cell, and a reference signal time difference.

3. The method of claim 1, wherein at least one resource configured based on the predetermined resource configuration framework includes a same time periodicity as the synchronization signal block resources, the synchronization signal block resources being dedicated for at least one of initial access or beam management, and the at least one resource configured based on the predetermined resource configuration framework includes a different time periodicity as the synchronization signal block resources dedicated for at least one of initial access or beam management.

4. The method of claim 1, wherein the predetermined resource configuration framework is a channel state information reference signal framework.

5. The method of claim 4, wherein the channel state information reference signal framework further comprises:

a configuration of a set of periodic channel state information reference signal resources associated with at least one of a reference cell or a transmit-receive point.

6. The method of claim 4, wherein the channel state information reference signal framework further comprises:

a configuration of a set of non-zero-power channel state information reference signal resources for beam management associated with at least one of a reference cell or a transmit-receive point.

7. The method of claim 1, wherein the predetermined resource configuration framework is a demodulation reference signal framework.

8. The method of claim 1, wherein the predetermined resource configuration framework is a combination of a synchronization signal block, a non-zero-power channel state information reference signal, a zero power channel state information reference signal, and a demodulation reference signal framework.

9. A method, comprising:

configuring, by higher layer signaling, at least one resource based on a predetermined resource configuration framework for positioning reference signals in a beamforming operation, wherein the predetermined resource configuration framework further comprises a configuration of a set of synchronization signal block resources associated with at least one of a reference cell or a transmit-receive point, and wherein at least one resource configured based on the predetermined resource configuration framework includes a synchronization signal block resource muting pattern in time-domain for a terminal device that defines reference signal time difference measurement occasions, and that defines a set of synchronization signal block resources to be transmitted simultaneously based on a physical cell identifier, or based on synchronization signal block resource indicators within a cell;

providing, by at least one network device, positioning assistance information to the terminal device based on the predetermined resource configuration framework;

requesting, at the at least one network device, at least one measurement from the terminal device;

receiving, in response to the request, at least one report from the terminal device, wherein the at least one report includes measurement information based on the predetermined resource configuration framework;

wherein the at least one report includes a number of the at least one measurement having a highest reference signal receive power or signal-to-noise ratio relative to other positioning reference signal blocks within a set of a number of synchronization signal block indices, the set of synchronization signal block indices having a highest reference signal received power measurement relative to other synchronization signal block indices, where the number of the at least one measurement is less than or equal to the number of synchronization signal block indices;

transmitting, at a first time instant, a first set of a plurality of synchronization signal block resources having different physical cell identifiers that are available for reference signal time difference measurements at the first time instant, wherein none of the synchronization signal block resources of the first set overlap in frequency; and transmitting, at a second time instant, a second set of a plurality of synchronization signal block resources having different physical cell identifiers that are available for reference signal time difference measurements at the second time instant;

wherein the at least one measurement is reported based on the transmitted first set of the plurality of synchronization signal block resources and the transmitted second set of the plurality of synchronization signal block resources.

10. The method of claim 9, further comprising:

receiving a reference signal time difference report, wherein the reference signal time difference report includes a positioning reference signal index in at least one reference cell, a positioning reference signal index in at least one neighbor cell, and a reference signal time difference.

11. The method of claim 9, wherein at least one resource configured based on the predetermined resource configuration framework includes a same time periodicity as the synchronization signal block resources, the synchronization signal block resources being dedicated for at least one of initial access or beam management, and the at least one resource configured based on the predetermined resource configuration framework includes a different time periodicity as the synchronization signal block resources dedicated for at least one of initial access or beam management.

12. The method of claim 9, wherein the predetermined resource configuration framework is a channel state information reference signal framework.

13. The method of claim 12, wherein the channel state information reference signal framework further comprises:

a configuration of a set of periodic mobility channel state information reference signal resources associated with at least one of a reference cell or a transmit-receive point.

14. The method of claim 9, wherein the predetermined resource configuration framework is a combination of a synchronization signal block, a non-zero-power channel state information reference signal, a zero power channel state information reference signal, and a demodulation reference signal framework.

15. An apparatus, comprising:

at least one processor; and at least one non-transitory memory including computer program code, the at least one memory and the computer program code configured to, with the at least one processor, cause the apparatus to:

receive, at the apparatus, from at least one network device, positioning assistance information based on a predetermined resource configuration framework for positioning reference signals in a beamforming operation, wherein the predetermined resource configuration framework further comprises a configuration of a set of synchronization signal block resources associated with at least one of a reference cell or a transmit-receive point, and wherein at least one resource configured based on the predetermined resource configuration framework includes a synchronization signal block resource muting pattern in time-domain for the apparatus that defines reference signal time difference measurement occasions, and that defines a set of synchronization signal block resources to be transmitted simultaneously based on a physical cell identifier, or based on synchronization signal block resource indicators within a cell;

receive a request for at least one measurement from the at least one network device;

determine the at least one measurement based on the predetermined resource configuration framework;

report, in response to the request, the at least one measurement based on the predetermined resource configuration framework;

determine a set comprising a number of synchronization signal block indices having a highest reference signal received power measurement relative to other synchronization signal block indices;

perform the at least one measurement on positioning reference signal blocks associated with the set comprising the number of synchronization signal block indices having the highest reference signal received power measurement relative to other synchronization signal block indices;

wherein the reporting comprises at least one report that includes a number of the at least one measurement having a highest reference signal receive power or signal-to-noise ratio relative to other positioning reference signal blocks within the set of synchronization signal block indices, where the number of the at least one measurement is less than or equal to the number of synchronization signal block indices;

receive, at a first time instant, a first set of a plurality of synchronization signal block resources having different physical cell identifiers that are available for reference signal time difference measurements at the first time instant, wherein none of the synchronization signal block resources of the first set overlap in frequency; and receive, at a second time instant, a second set of a plurality of synchronization signal block resources having different physical cell identifiers that are available for reference signal time difference measurements at the second time instant;

wherein the at least one measurement is reported based on the received first set of the plurality of synchronization signal block resources and the received second set of the plurality of synchronization signal block resources.

16. An apparatus, comprising:

at least one processor; and at least one non-transitory memory including computer program code, the at least one memory and the computer program code may be configured to, with the at least one processor, cause the apparatus to:

configure, by higher layer signaling, at least one resource based on a predetermined resource configuration framework for positioning reference signals in a beamforming operation, wherein the predetermined resource configuration framework further comprises a configuration of a set of synchronization signal block resources associated with at least one of a reference cell or a transmit-receive point, and wherein at least one resource configured based on the predetermined resource configuration framework includes a synchronization signal block resource muting pattern in time-domain for a terminal device that defines reference signal time difference measurement occasions, and that defines a set of synchronization signal block resources to be transmitted simultaneously based on a physical cell identifier, or based on synchronization signal block resource indicators within a cell;

provide positioning assistance information to the terminal device based on the predetermined resource configuration framework;

request at least one measurement from the terminal device;

receive, in response to the request, at least one report from the terminal device, wherein the at least one report includes measurement information based on the predetermined resource configuration framework;

wherein the at least one report includes a number of the at least one measurement having a highest reference signal receive power or signal-to-noise ratio relative to other positioning reference signal blocks within a set of a number of synchronization signal block indices, the set of synchronization signal block indices having a highest reference signal received power measurement relative to other synchronization signal block indices, where the number of the at least one measurement is less than or equal to the number of synchronization signal block indices;

transmit, at a first time instant, a first set of a plurality of synchronization signal block resources having different physical cell identifiers that are available for reference signal time difference measurements at the first time instant, wherein none of the synchronization signal block resources of the first set overlap in frequency; and transmit, at a second time instant, a second set of a plurality of synchronization signal block resources having different physical cell identifiers that are available for reference signal time difference measurements at the second time instant;

wherein the at least one measurement is reported based on the transmitted first set of the plurality of synchronization signal block resources and the transmitted second set of the plurality of synchronization signal block resources.

17. The method of claim 1, wherein:
the positioning assistance information is received from a location server; and
the positioning assistance information is based on a higher layer signaling network configuration.

18. The method of claim 3, wherein the synchronization signal block resources are dedicated for initial access, and the at least one measurement is a reference signal received power measurement or a signal to interference noise ratio measurement.

* * * * *